Figure 2:
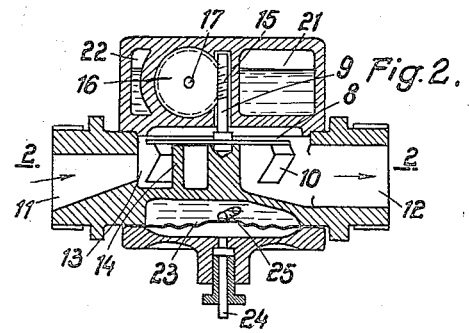

July 4, 1933.   H. GAHLER   1,916,211

METER FOR HOT WATER

Filed Feb. 16, 1927

Inventor:
Heinrich Gahler
by Carter & Keister
Attorney

Patented July 4, 1933

1,916,211

UNITED STATES PATENT OFFICE

HEINRICH GAHLER, OF DRESDEN-ALTSTADT, GERMANY

METER FOR HOT WATER

Application filed February 16, 1927, Serial No. 168,698, and in Germany February 19, 1926.

The invention relates to a meter for heat of hot water measuring both the temperatures and quantities of hot water, and embodies a number of improvements not found in any existing type of meter. There are devices known at present into whose supply and return pipings measuring apparatus have been built for transmitting the temperatures and water quantities to a common recording mechanism, but the improvements brought about by this invention make indicators really useful.

According to the invention, a measuring apparatus is built into the supply piping for the water heater and a vessel into the return piping from the heater, both the measuring apparatus and the vessel being partly filled with a liquid and partly with a gas as expanding medium. Between the measuring apparatus and the vessel a connecting piping is provided, and the measuring apparatus contains a diaphragm which is thus influenced on both sides by the liquids and gaseous expanding media in the measuring apparatus and vessel. Moreover, the measuring apparatus contains also a water measuring device of known type and a counter for the water measuring device. Between the diaphragm and the water measuring device or counter, members are provided for transmitting the motion of the diaphragm to the counter by influencing the mode of action of the water measuring device. Also, the pressures of the expanding media in the said measuring apparatus and vessel can be regulated by varying the quantitive relation between the liquids and the gaseous expanding media. The difference existing between the pressures exerted by liquids and gases has its effect upon the diaphragm, so that they are transmitted to the measuring device by the members stated.

Oil may be used for instance as expanding liquid, and suitable gases are air or carbon monoxide gas.

Further details of the invention can be seen by looking at the drawing and will be discussed here later on.

Figure 5:
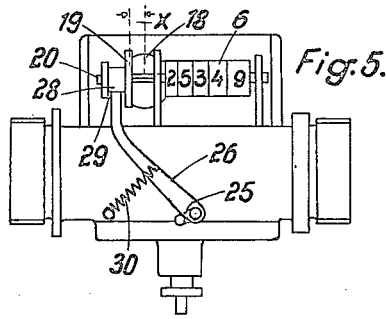
Figure 3:
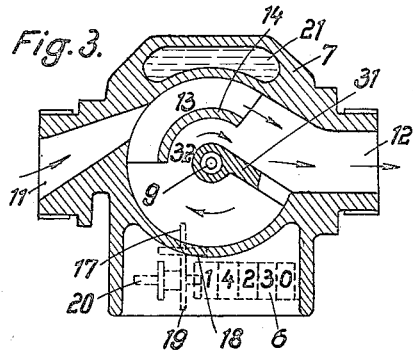
Figure 6:
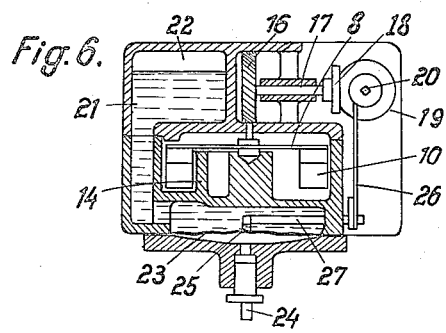
Figure 4:
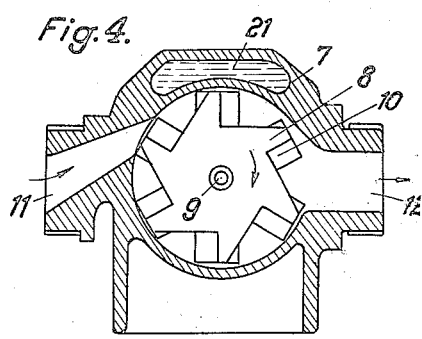
Figure 7:
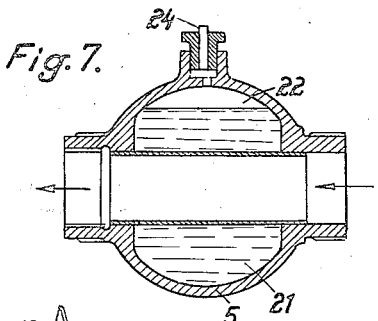
Figure 1:
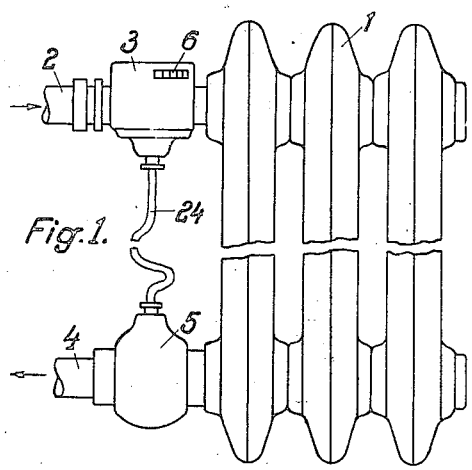
Figure 8:
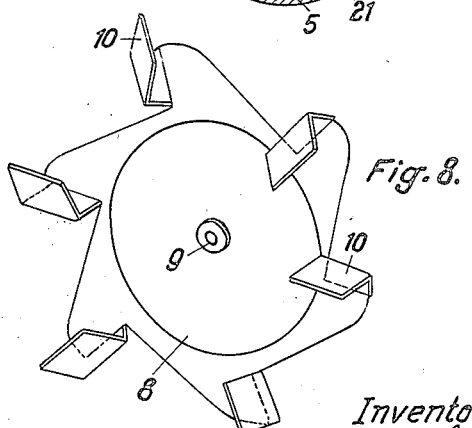

One form of the invention is illustrated in the accompanying drawing, in which Figure 1 exemplifies the method of attaching the object of the invention to a heater; Fig. 2 is a vertical section of the measuring apparatus built into the supply piping; Fig. 3, a horizontal section on the line 2—2, Fig. 2, without the vane; Fig. 4, a similar section as Fig. 3 but with the vane put in; Fig. 5, an external view of Fig. 2; Fig. 6, a vertical section of the indicator; Fig. 7, a vertical section of the vessel built into the return piping; and Fig. 8, a perspective view of the vane wheel seen from below.

1 is the heater whose supply piping 2 is fitted with the measuring apparatus 3 while its return piping 4 contains the vessel 5. The upper measuring apparatus 3 (Fig. 2) serves for measuring the volume of hot water passing through and its temperature while in the lower vessel 5 the temperature is influenced by liquids and gaseous expanding media so as to convert heat into pressure. The pressures of the liquids and gaseous expanding media in the measuring apparatus 3 and the vessel 5 are combined in the upper measuring apparatus and the difference is transmitted to a common registering mechanism 6 which may be of any suitable type.

The measuring apparatus consists mainly of a casing 7 in which a vane wheel 8 having a vertical shaft 9 is rotatably arranged. The vanes 10 of the wheel are executed to resemble arrows pointing in the direction of flow (Fig. 8) so that the formation of eddies in front of the vanes is practically excluded. The hot water entering through the nozzle-shaped inlet connection 11 and striking the vane wheel 8 in tangential direction is pressed towards the outlet connection 12 owing to the wingshaped vanes whence it passes to the heater 1. To guide the hot water properly within the casing a measuring channel 13 has been provided limited on the outside by the wall of the casing and on the inside, by an intermediate wall 14, and being just large enough to permit the vanes of the wheel to pass during its revolution. The upper end of the vertical shaft 9 forms a worm 15 engaging a worm wheel 16 on the shaft 17 whose front end carries the friction disk 18 cooperating with another friction disk 19 slidingly arranged on a polygonal (for instance, a square) shaft 20. If the friction disk 19 occupies the position shown in Fig. 3 (zero position), no measurement will be transmitted to the registering mechanism 6 even during a revolution of the vane 8, and only if the friction disk 19 is shifted from its zero position by a change in temperature to a position shown, for example, in Fig. 5, will transmission take place. The distance which the upper friction disk 19 will be moved from its zero position will be the longer, the greater the difference in temperature and thereby in pressures is, and finally it will occupy a position corresponding to a distance $x$ from its zero position (Fig. 5) so that the product to be counted, viz. quantity of heating water times drop in temperature in the heater is formed and transmitted to the counting mechanism, which is the purpose of the invention. The functioning of the friction disks and the registering mechanism are well known so that further description of them can be dispensed with.

The shifting of the friction disk 19 takes place as follows: The measuring apparatus 3 and the vessel 5, in a certain proportion determinable at will, are filled partly with an expanding liquid 21 such as rape or olive oil and partly with a suitable gas 22 such as air or carbonic acid which retain their state of aggregation regardless of the pressure or temperatures to which they are exposed. While flowing through the measuring apparatus and the vessel 5 the hot water transmits its heat directly to the apparatus and thus to the liquid or gas mentioned which will expand according to temperatures and is kept thereby under different pressure. Pressure in the measuring apparatus will always be greater than in the vessel 5 as the temperatures in the measuring apparatus are higher. Both pressures, from different sides, act on a diaphragm 23 arranged in the measuring apparatus, and the pressure in the vessel 5 finds an outlet to the measuring apparatus through the piping 24. On the diaphragm 23 rests the short arm 25 of a bell crank 26 of a type shown in Figs. 2, 5, and 6, both arms being interconnected by the shaft 27 while otherwise being arranged almost perpendicularly to one another. A sleeve 28 of the long arm engages a groove 29 in the friction disk 19 so that the latter is shifted on its shaft 20 when the bell crank is actuated, a tension spring 30 serving to keep the short arm 25 always in touch with the diaphragm 23. If the latter is pressed down, the bell crank 26 will shift the friction disk 19 to the left (Fig. 5) and the greater difference in temperature will be correspondingly transmitted to the registering mechanism.

To prevent the formation of eddies in the measuring channel 13 a sluice 31 (Fig. 3) has been provided within the casing while eddies forming behind the vanes 10 will be conducted away through the space 32 between the sluice 31 and the inner wall 14 of the casing. (See the direction of the arrow in Fig. 3.)

This internal arrangement of the meter for heat of hot water makes it possible to be able to operate with a total resistance of approximately 20 mm. water column, which is absolutely necessary in the usual circulating type of hot water heating with temperature drop. By making simultaneous use of a suitable gas in addition to an expanding liquid increase in pressure is effected elastically and not rigidly. By varying the proportion of liquid to that of the gas the indicator can be adjusted at will and adapted exactly to actual conditions so that a special correcting device can be dispensed with.

My invention is not confined to the details of construction enumerated, some of which may be of a different type without affecting the efficiency of the meter provided the functioning and connection of the various units such as drive, measuring apparatus, diaphragm etc. remain unaltered.

I claim:—

In a calorimeter for water heaters provided with supply and return pipings a measuring apparatus built into the supply piping and a vessel arranged in the return piping, the said measuring apparatus and vessel being partly filled with liquid and partly with gas as expanding media, a connecting piping between the said measuring apparatus and the said vessel, a diaphragm disposed in the said measuring apparatus and influenced bilaterally by the liquid and gaseous expanding media of the said measuring apparatus and vessel, a water meter in the said measuring apparatus, a counter for the said measuring apparatus, and means including variable speed transmission members communicating the movement of the said water meter to said counter, and means operated by said diaphragm to vary said transmission members.

In testimony whereof I affix my signature.

HEINRICH GAHLER.